(12) United States Patent
Tao et al.

(10) Patent No.: US 8,826,997 B2
(45) Date of Patent: Sep. 9, 2014

(54) AUTOMATIC REVERSIBLE TEMPERATURE RESPONSIVE VALVE AND FIRE SPRINKLER

(75) Inventors: Rongjia Tao, Cherry Hill, NJ (US); Ke Huang, Philadelphia, PA (US); Edward Kaczanowicz, Woodstown, NJ (US)

(73) Assignee: Temple University—of the Commonwealth System of Higher Education, Philadelphia, PA (US)

( * ) Notice: Subject to any disclaimer, the term of this patent is extended or adjusted under 35 U.S.C. 154(b) by 1417 days.

(21) Appl. No.: 12/525,951

(22) PCT Filed: Feb. 5, 2008

(86) PCT No.: PCT/US2008/001491
§ 371 (c)(1),
(2), (4) Date: Nov. 10, 2010

(87) PCT Pub. No.: WO2008/115316
PCT Pub. Date: Sep. 25, 2008

(65) Prior Publication Data
US 2011/0048746 A1    Mar. 3, 2011

Related U.S. Application Data

(60) Provisional application No. 60/900,585, filed on Feb. 9, 2007.

(51) Int. Cl.
*A62C 37/08* (2006.01)
(52) U.S. Cl.
USPC ............................................. 169/37; 169/19
(58) Field of Classification Search
CPC ...... A62C 35/68; A62C 37/50; F16K 17/003; F16K 17/50; F16K 31/002; F16K 99/0036
USPC ........ 169/37; 236/88; 251/11, 65; 137/72, 79
See application file for complete search history.

(56) References Cited

U.S. PATENT DOCUMENTS

| | | | |
|---|---|---|---|
| 2,437,563 A | | 3/1948 | Seaver |
| 2,601,579 A | * | 6/1952 | Wittmann ....................... 236/88 |
| 2,678,774 A | | 5/1954 | Arvin |
| 3,284,736 A | * | 11/1966 | Vance, Jr. ...................... 335/146 |
| 4,303,196 A | | 12/1981 | Raines et al. |
| 4,407,448 A | | 10/1983 | Yamanaka et al. |
| 4,590,999 A | | 5/1986 | Snaper |

OTHER PUBLICATIONS

International Search Report for PCT/US2008/001491 filed Feb. 5, 2008, dated Sep. 18, 2008.

* cited by examiner

*Primary Examiner* — Len Tran
*Assistant Examiner* — Viet Le
(74) *Attorney, Agent, or Firm* — RatnerPrestia

(57) ABSTRACT

A fire sprinkler including a generally tubular body having inlet and outlet ends is disclosed. The body defines a fluid flow passage extending between the inlet and the outlet such that the outlet is in fluid flow communication with the inlet. A magnetized member is disposed within the fluid flow passage and is movable between a first position wherein fluid flow communication between the outlet and the inlet is blocked and a second position wherein fluid flow communication between the outlet and the inlet is open. A temperature sensitive magnetic member is coupled to the body and has sufficient magnetic properties to attract the magnetized member below a predetermined temperature, thereby maintaining the magnetized member in the first position. The temperature sensitive magnetic member loses a sufficient percentage of its magnetic properties at and above the predetermined temperature, thereby allowing the magnetized member to move to the second position.

12 Claims, 4 Drawing Sheets

AUTOMATIC REVERSIBLE TEMPERATURE RESPONSIVE VALVE AND FIRE SPRINKLER

This application is the U.S. national phase application of PCT International Application No. PCT/US2008/001491, filed Feb. 5, 2008, which claims priority to U.S. Patent Application No. 60/900,585, filed Feb. 9, 2007, the contents of such applications being incorporated by reference herein in their entirety.

BACKGROUND OF THE INVENTION

Fire sprinklers are widely used in all kinds of buildings, including hotels, hospitals, shopping malls, and schools. Current fire sprinklers incorporate a plastic tube filled with a liquid that seals a passage in the sprinkler, precluding water flow from a pressurized water supply line through the sprinkler. When the plastic tube heats up, such as in the event of a fire, the liquid within the tube boils and generates a high vapor pressure, breaking the plastic tube and allowing fluid flow through the sprinkler. Once the tube is broken, the only way to stop water from spraying from the sprinkler is to cut off the water supply to the sprinkler, such as by closing a valve upstream of the sprinkler. Even if a fire is quickly extinguished, continued operation of water sprinklers may continue to damage the space in which the fire erupted.

U.S. Pat. No. 4,590,999 discloses embodiments of a magnetically operated fire sprinkler with a sealing device that loses its magnetism at a predetermined high temperature, opening the sprinkler and allowing water flow therethrough. The sealing device, however, loses a substantial amount of its magnetism upon returning to ambient temperature or, even without a high temperature event, over time, which may lead to leaks or may require replacement of the magnets after a fire event.

There exists a need to develop a water sprinkler and/or valve that operates in response to high temperatures generated by a fire, yet automatically shuts off water flow in response to a lower temperature, such as after the fire is extinguished, which operates magnetically and which comprises a magnetic switch which is permanently operable such that the parts of which do not need to be periodically replaced.

SUMMARY OF THE INVENTION

Briefly, an embodiment of the present invention provides a fire sprinkler. The fire sprinkler includes a generally tubular body having an inlet end and an outlet end. The body defines a fluid flow passage extending therethrough between the inlet end and the outlet end such that outlet end is in fluid flow communication with inlet end. A magnetized member is disposed within fluid flow passage and is movable between a first position wherein fluid flow communication between the outlet end and the inlet end is blocked and a second position wherein fluid flow communication the inlet end is blocked and a second position wherein fluid flow communication between the outlet end and the inlet end is open. A temperature sensitive magnetic member is coupled to the body and has sufficient magnetic properties to attract the magnetized member below a predetermined temperature, thereby maintaining the magnetized member in the first position. The temperature sensitive magnetic member loses a sufficient percentage of its magnetic properties at and above the predetermined temperature, thereby allowing the magnetized member to move to the second position.

Further, an alternative embodiment of the present invention provides a temperature-operated valve comprising a body having an inlet end and an outlet end. The body defines a fluid flow passage extending therethrough between the inlet end and the outlet end such that outlet end is in fluid flow communication with inlet end. A magnetized member is disposed within fluid flow passage and movable between a first position wherein fluid flow communication between the outlet end and the inlet end is blocked and a second position wherein fluid flow communication between the outlet end and the inlet end is open. A temperature sensitive magnetic member is coupled to the body and has sufficient magnetic properties to attract the magnetized member below a predetermined temperature, thereby maintaining the magnetized member in the first position. The temperature sensitive magnetic member loses a sufficient percentage of its magnetic properties at and above the predetermined temperature, thereby allowing the magnetized member to move to the second position.

Also, another embodiment of the present invention provides a method of operating a fire sprinkler comprising a magnetized member operatively disposed within a fluid flow path. The method comprises the steps of maintaining the magnetized member in a closed position, sealing the fluid flow path; heating the fire sprinkler to a predetermined temperature; releasing the magnetized member, opening the fluid flow path; cooling the fire sprinkler below the predetermined temperature; and retaining the magnetized member in the closed position, resealing the fluid flow path.

Additionally, another embodiment of the present invention provides a method of operating a valve. The valve has a body defining a fluid flow passage, a magnetized member disposed within the fluid flow passage, and a temperature sensitive magnetic member operatively couplable to the magnet. The method comprises the steps of magnetically attracting the magnetized member to a first position by the temperature sensitive magnetic member, thereby precluding fluid flow through the fluid flow passage; heating the temperature sensitive magnetic member to a predetermined temperature, thereby reducing magnetic attraction between the magnetized member and the temperature sensitive magnetic member; and moving the magnetized member to a second position, thereby allowing fluid flow through the fluid flow passage.

A further embodiment of the present invention provides a method of producing an alloy having a Curie temperature of about 66 degrees Celsius. The method comprises the steps of heating a combination of about 74 percent nickel and about 26% copper by weight to about 1500 degrees Celsius in the presence of an inert gas, forming an alloy and annealing the alloy at a temperature of between about 935 degrees Celsius and about 1100 degrees Celsius for at least 48 hours.

Also, an alternative embodiment of the present invention provides a fire sprinkler comprising a body having an inlet end, an outlet end, a fluid flow passage extending between the inlet end and the outlet end and a magnetized member disposed within the fluid flow passage, wherein the magnetized member is movable to operate the fire sprinkler between an open position and a closed position.

BRIEF DESCRIPTION OF THE DRAWINGS

The accompanying drawings, which are incorporated herein and constitute part the specification, illustrate presently desired embodiments of the invention, and, together with the general description given above and the detailed description given below, serve to explain features of the invention. In the drawings.

DETAILED DESCRIPTION OF THE INVENTION

Certain terminology is used in the following description for convenience only and is not limiting. The word "upstream" is used to define a direction closer to the inlet end of the fire sprinkler according to the present invention, and the word "downstream" is used to define a direction closer to the outlet end of the fire sprinkler according to the present invention. The word "magnetized" is used herein to describe an object that produces or possesses a magnetic field with sufficient strength to attract a magnetic object. As used herein, the word "magnetic" describes an object that does not produce a magnetic field with sufficient strength to attract another magnetic object, but may be attracted to a magnetized object. The terminology includes words specifically mentioned, derivatives thereof and words of similar import. The exemplary embodiments illustrated below are not intended to be exhaustive or to limit the invention to the precise form disclosed. These embodiments are chosen and described to best explain the principle of the invention and its application in practical use and to enable others skilled in the art to best utilize the invention.

The present invention provides a novel fire sprinkler and/or valve that automatically operates and secures itself, and is reusable. Further, the present invention provides a novel material that has temperature sensitive magnetic properties and is used to operate valve and/or the fire sprinkler in which the valve is included between a closed and open position. Additionally, the present invention provides a method for manufacturing the novel material.

While the operation of the invention is described with respect to a fire sprinkler, those skilled in the art will appreciate that the principles of operation discussed herein are equally applicable to any liquid flow valve having the structure described below.

Figure 1:
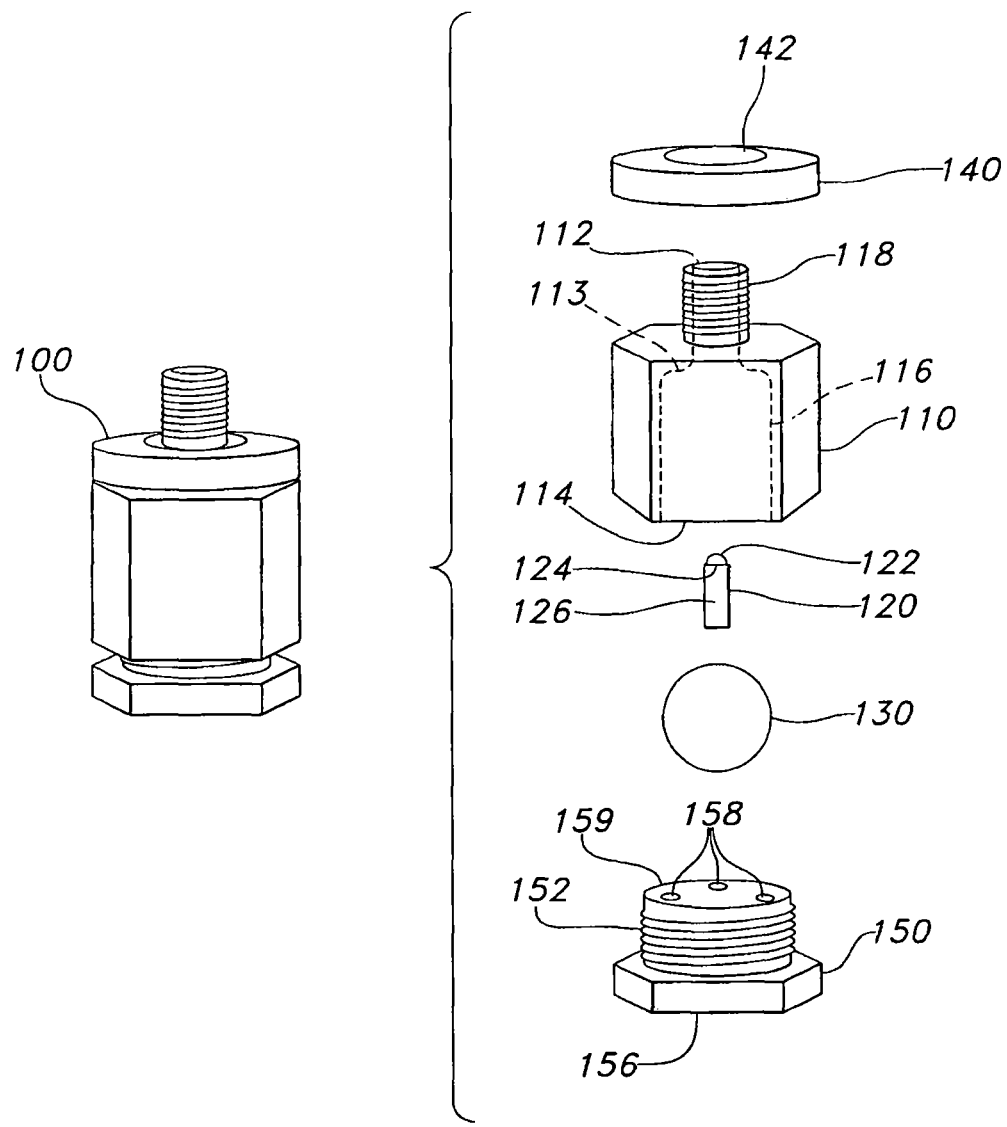
FIG. 1 is an exploded perspective view and assembled perspective view of a fire sprinkler according to an exemplary embodiment of the present invention.
Figure 2:
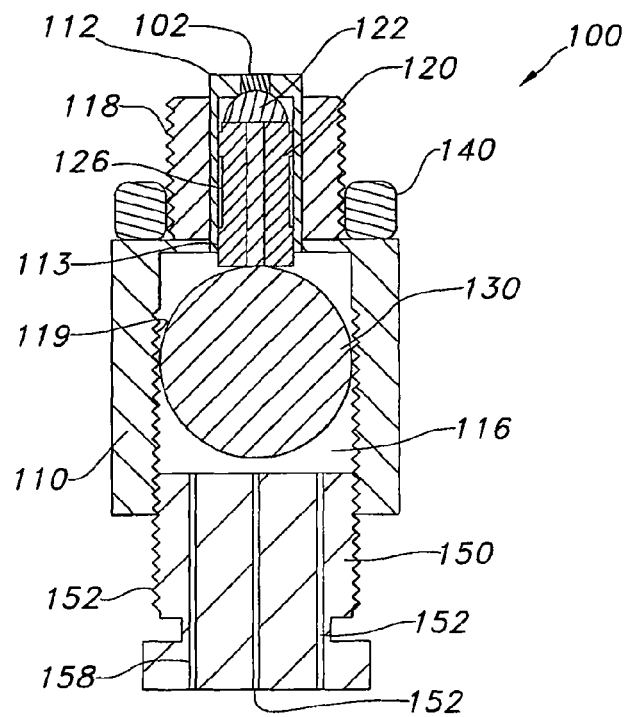
FIG. 2 is a side profile view, in section, of the fire sprinkler of FIG. 1, with the sprinkler in a closed position.
Figure 3:
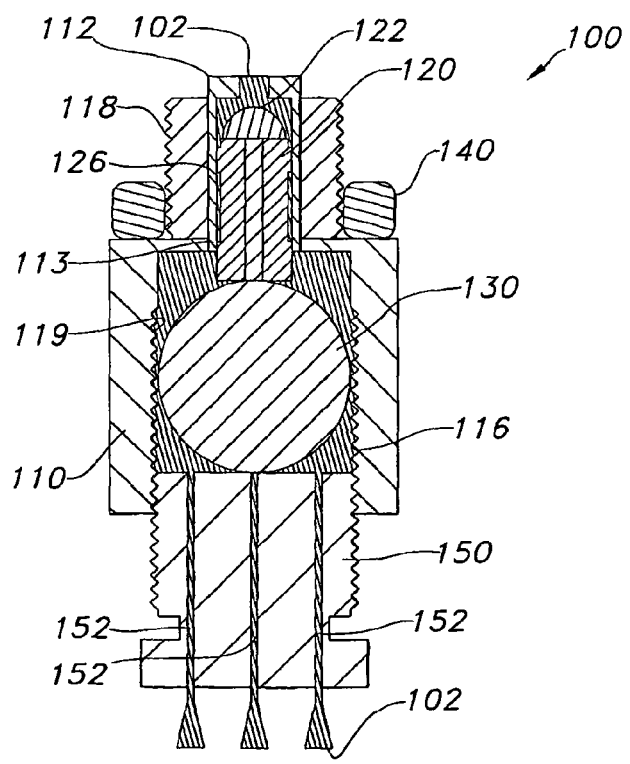
FIG. 3 is a side profile view, in section, of the fire sprinkler of FIG. 1, with the sprinkler in a open position.

Referring specifically to FIGS. 1-3, an exemplary embodiment of a fire sprinkler 100 according to the present invention is shown. Fire sprinkler 100 includes a generally tubular body 110 having an inlet end 112, an outlet end 114. Body 110 defines a fluid flow passage 116 extending through body 110 between inlet end 112 and outlet end 114 such that outlet end 114 is in fluid communication with inlet end 112. Body 110 may be constructed from brass. Inlet end 112 may include a threaded connection 118 for threadably securing fire sprinkler 100 to an upstream water supply line, such as a fire sprinkler system (not shown). Inlet end 112 includes a necked down portion 113 that reduces the diameter of fluid flow passage 116 relative to the diameter of fluid flow passage 116 at outlet end 114. Outlet end 114 includes internal threads 119.

A valve plunger 120 is slidably disposed within fluid flow passage 116. Valve plunger 120 includes an upstream sealing end 122 and a downstream end 124. Upstream end 122 may be hemispherical or dome shaped and serves to seal fluid flow passage 116 at necked down portion 113 when fire sprinkler 100 is in a closed position. Valve plunger 120 further includes a plurality of exterior channels 126 extending between upstream sealing end 122 and downstream end 124. Channels 126 allow flow of water 102 past valve plunger 120 when upstream sealing end 122 is disposed away from necked down portion 113 in order to allow flow of water 102 from inlet end 112, past valve plunger 120, and toward outlet end 114. Valve plunger 120 may be constructed from brass, with upstream sealing end 122 being constructed from rubber or other suitable sealing material.

A magnetized member, such as a magnet 130, is disposed within fluid flow passage 116 downstream of valve plunger 120. Magnet 130 engages downstream end 124 of valve plunger 120 and longitudinally translates valve plunger 120 within fluid flow passage 116 to open or close fire sprinkler 100. In the embodiment shown in FIGS. 1-3, magnet 130 is generally spherical, although those skilled in the art will recognize that magnet 130 may be other shapes that allow fluid flow around or through magnet 130 within fluid flow passage 116 when fire sprinkler 100 is in an open, or operating, position. Magnet 130 may be constructed from a Neodymium-Iron-Boron (NeFeBo) alloy with a nickel surface coating. The NeFeBo alloy was chosen for its strong and stable magnetism, which does not significantly lose its magnetic properties at relatively high (66 to 150 degrees Celsius) temperatures. Alternatively, magnet 130 may be constructed from any other suitable magnetized material with similar properties.

While separate magnet 130 and plunger 120 are disclosed, those skilled in the art will recognize that valve plunger 120 may be constructed from a magnetized material and magnet 130 may be omitted from fire sprinkler 100 in its entirety.

A thermally responsive magnetic member forms a sealing ring 140. Sealing ring 140 includes a central opening 142 that is sized to allow sealing ring 140 to be disposed over threaded connection 118 and seat on body 110. Sealing ring 140 is located exteriorly of body 110 and is exposed to external ambient temperature.

Sealing ring 140 may be constructed from a nickel-copper (NiCu) alloy that includes about 74% of nickel and about 26% of copper by weight. The alloy may be formed by cutting the nickel and copper into small pieces and melting the cut nickel and copper in a furnace at a temperature of at least about 1500° Celsius under an inert gas, such as argon. The melted nickel and copper is mixed together to form an alloy in a desired shape, such as a ring. The alloy is allowed to cool and is then annealed between about 935° Celsius and about 1100° Celsius for at least about 48 hours.

Figure 4:
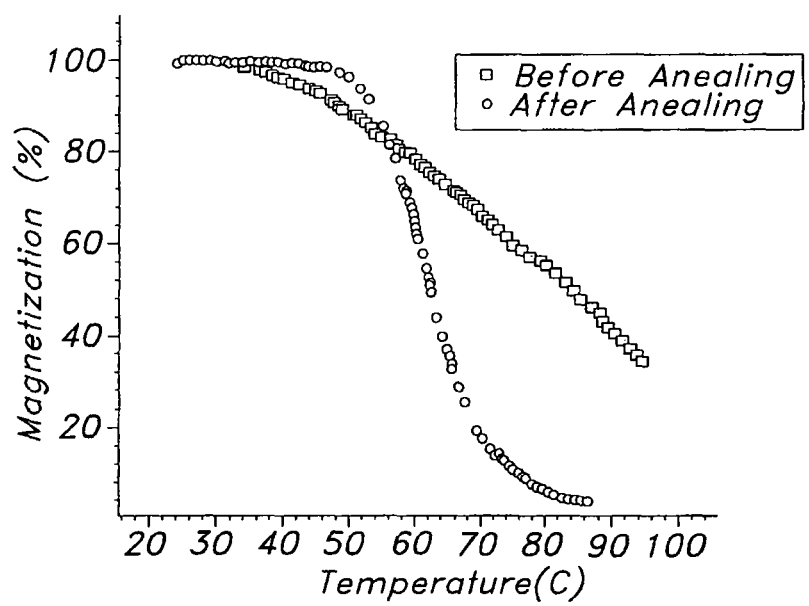
FIG. 4 is a graph showing magnetization percent vs. temperature for a magnetic alloy according to the present invention.

The alloy produced from this process has a Curie temperature of about 66° Celsius. The alloy exhibits magnetic properties at temperatures below about 66° Celsius and loses its magnetic properties rapidly at temperatures above about 66° Celsius, as shown in the graph of FIG. 4. As may be seen in FIG. 4, the annealing process provides the alloy with a sharp magnetic transition at a temperature between about 60° Celsius and about 70° Celsius. As shown in FIG. 4, a temperature of 66° Celsius corresponds to a magnetization percentage of approximately 28% for the disclosed alloy. Those skilled in the art, however, will recognize that any other material or alloy that has a magnetization curve similar to the curve shown in FIG. 4 and that has a magnetization of about 26% or lower at about 66° Celsius or in the range of about 60 degrees Celsius to about 70 degrees Celsius may be used.

Referring back to FIGS. 1-3, an adjuster 150 is threadably coupled to outlet end 114 of body 110. Adjuster 150 includes threads 152 that threadably couple to threads 119 inside fluid flow passage 116 proximate to outlet end 114 of body. Threads 152, 119 allow adjuster 150 to adjust the location of magnet 130 within fluid flow passage 116 to regulate flow of water 102 through passage 116 when fire sprinkler 100 is in operation. Adjuster 150 may be constructed from brass.

Adjuster 150 further includes an upstream end 154 on which magnet 130 is seated when fire sprinkler 100 is in an open condition and an outlet end 156 which discharges water 102 from fire sprinkler 100 when fire sprinkler 100 is in operation. A plurality of adjuster through-passages 158 extend through adjuster 150 between upstream end 154 and outlet end 156. Adjuster through-passages 158 allow water to exit fluid flow passage 116 for discharge from fire sprinkler 100. Adjuster through-passages 158 are shaped and spaced to provide a spray of water exiting fire sprinkler 100. Adjuster 150 adjusts the position of magnet 130 within the fluid flow passage 116 and also holds magnet 130 within fire sprinkler 100 during an operational event, such as a fire.

In use, fire sprinkler 100 is coupled to a sprinkler system (not shown), such as by threading threaded connector 118 of body 110 into the sprinkler system such that inlet end 112 is in fluid flow communication with pressurized water 102 within the sprinkler system. Magnet 130 is magnetically attracted to sealing ring 140 due to magnetic properties of sealing ring 140 at ambient room temperature. Magnet 130 urges valve plunger 120 upward in fluid flow passage 116 such that upstream sealing end 122 of valve plunger 120 seals necked down portion 113, precluding fluid flow through fluid flow passage 116.

When sealing ring 140 is heated to a temperature of about 66° Celsius, such as for example, during a fire event, sealing ring 140 rapidly loses a sufficient percentage of its magnetic property, losing its attraction to magnet 130. Magnet 130 falls due to gravity and/or upstream water pressure onto upstream end 154 of adjuster 150, allowing valve plunger 122 to also fall, moving upstream sealing end 122 of valve plunger 120 away from necked down portion 113. This movement allows pressurized water 102 from the sprinkler system to flow through inlet end 112 and through fluid flow passage 116. In addition to gravity pulling valve plunger 120 downward within fluid flow passage 116, the force of the pressurized water 102 against upstream sealing end 122 also forces valve plunger 120 away from necked down portion 113. The pressurized water 102 flows through channels 126 between valve plunger 120 and inlet end 112, around magnet 130 and into adjuster through-passages 158, where the water 102 is discharged from fire sprinkler 100.

When sealing ring 140 cools to a temperature below about 66° Celsius, sealing ring 140 regains its magnetic properties, attracting magnet 130 upward, which forces valve plunger 120 against necked down portion 113, resealing fluid flow passage 116 and stopping the flow of water 102 from the sprinkler system through fire sprinkler 100. In order for fire sprinkler 100 to close during operation, the magnetic attraction between magnet 130 and sealing ring 140 must overcome both the weight of magnet 130 and the force of water 102 against magnet 130 as water 102 flows through fluid flow passage 116.

Figure 5:
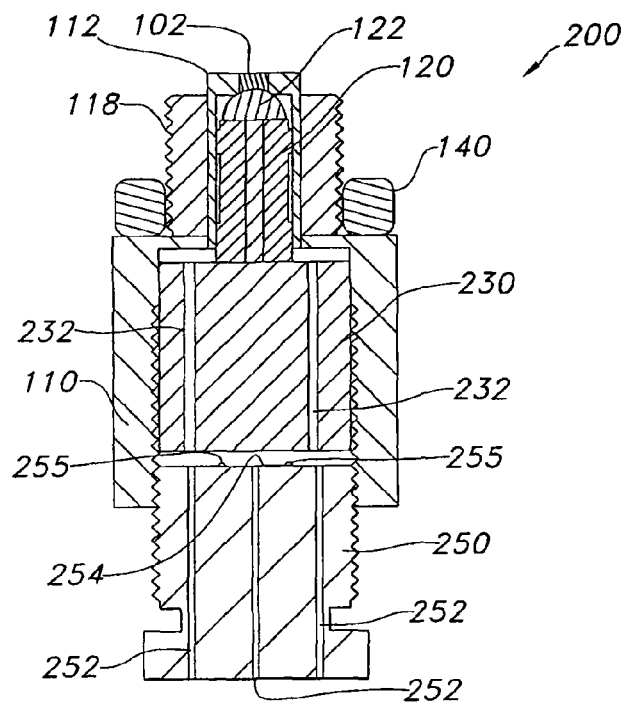
FIG. 5 is a side profile view, in section, of a fire sprinkler according to an alternative exemplary embodiment of the present invention, with the sprinkler in the closed position.
Figure 6:
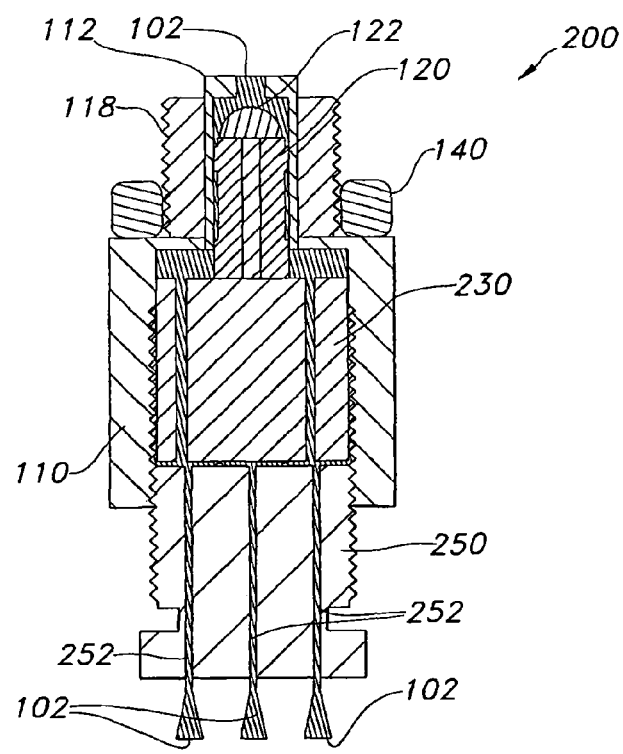
FIG. 6 is a side profile view, in section, of the fire sprinkler of FIG. 5, with the sprinkler in the open position.

An alternative embodiment of a fire sprinkler 200 is shown in FIGS. 5 and 6. Fire sprinkler 200 is similar to fire sprinkler 100, except that fire sprinkler 200 utilizes a magnet 230 that is generally disc shaped. Magnet 230 may include through passages 232 that allow fluid to flow from an upstream end of magnet 230, through magnet 230, to a downstream end of magnet 230. An adjuster 250 includes and upstream end 254 that includes a plurality of raised nubs 255 on which magnet 230 sits when fire sprinkler 200 is in an open or discharge condition. Nubs 255 allow fluid flowing from the downstream end 236 of magnet 230 to flow between magnet 230 and adjuster 250, and through adjuster through passages 258 for discharge from fire sprinkler 200.

Fire sprinklers 100, 200 each disclose a magnet 130, 230, respectively, disposed within fluid flow passage 116 and sealing ring 140 disposed outside of fluid flow passage 116. Magnets 130, 230 are each disposed within fluid flow passage 116 in order to allow water 102 to flow over magnets 130, 230, during operation of fire sprinklers 100, 200 in order to cool magnets 130, 230. Excessive heating of magnets 130, 230 may cause magnets 130, 140 to lose at least some of their magnetization over time, resulting in loss of magnetic attraction between magnets 130, 230 and sealing ring 140, allowing leakage of water 102 from fire sprinklers 100, 200 in non-fire events.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A fire sprinkler comprising:
   a generally tubular body having an inlet end and an outlet end, the body defining a fluid flow passage extending therethrough between the inlet end and the outlet end such that outlet end is in fluid flow communication with inlet end;
   a magnetized member disposed within fluid flow passage and movable between a first position wherein fluid flow communication between the outlet end and the inlet end is blocked and a second position wherein fluid flow communication between the outlet end and the inlet end is open; and
   a temperature sensitive magnetic member coupled to the body and having sufficient magnetic properties to attract the magnetized member below a predetermined temperature, thereby maintaining the magnetized member in the first position, the temperature sensitive magnetic member losing a sufficient percentage of its magnetic properties at and above the predetermined temperature, thereby allowing the magnetized member to move to the second position,
   wherein the temperature sensitive magnetic member is provided in the form of a sealing ring that is located exterior of the body of the fire sprinkler and is positioned over a threaded connection of the fire sprinkler for securing the fire sprinkler to an upstream water supply.

2. The fire sprinkler according to claim 1, wherein the predetermined temperature is about 66 degrees Celsius.

3. The fire sprinkler according to claim 1, further comprising a valve plunger operatively coupled to the magnetized member and movable with the magnetized member between a first plunger position wherein the plunger blocks fluid flow communication between the outlet end and the inlet end and a second plunger position wherein the plunger allows fluid flow communication between the outlet end and the inlet end.

4. The fire sprinkler according to claim 1, wherein the magnetized member is retained within the fluid flow passage when the magnetized member is in the second position.

5. The fire sprinkler according to claim 1, wherein the magnetized member comprises a NeFeBo alloy.

6. The fire sprinkler according to claim 1, wherein the temperature sensitive magnetic member is annealed.

7. A temperature-operated valve comprising:

a body having an inlet end and an outlet end, the body defining a fluid flow passage extending therethrough between the inlet end and the outlet end such that outlet end is in fluid flow communication with inlet end;

a magnetized member disposed within fluid flow passage and movable between a first position wherein fluid flow communication between the outlet end and the inlet end is blocked and a second position wherein fluid flow communication between the outlet end and the inlet end is open; and a temperature sensitive magnetic member coupled to the body and having sufficient magnetic properties to attract the magnetized member below a predetermined temperature, thereby maintaining the magnetized member in the first position, the temperature sensitive magnetic member losing a sufficient percentage of its magnetic properties at and above the predetermined temperature, thereby allowing the magnetized member to move to the second position, wherein the temperature sensitive magnetic member is provided in the form of a sealing ring that is located exterior of the body of the valve and is positioned over a threaded connection of the valve for securing the valve to an upstream water supply.

8. The temperature-operated valve according to claim 7, wherein the predetermined temperature is about 66 degrees Celsius.

9. The temperature-operated valve according to claim 7, wherein the temperature sensitive magnetic member comprises a metallic alloy.

10. The temperature-operated valve according to claim 9, wherein the metallic alloy comprises at least about 20 percent nickel and at least about 70 percent copper.

11. The temperature-operated valve according to claim 7, further comprising a valve plunger operatively coupled to the magnetized member and movable with the magnetized member between a first plunger position wherein the plunger blocks fluid flow communication between the outlet end and the inlet end and a second plunger position wherein the plunger allows fluid flow communication between the outlet end and the inlet end.

12. The temperature-operated valve according to claim 7, wherein the temperature sensitive magnetic member is annealed.

\* \* \* \* \*